US012588126B2

(12) United States Patent
Singvall et al.

(10) Patent No.: US 12,588,126 B2
(45) Date of Patent: Mar. 24, 2026

(54) ILLUMINATION SYSTEM

(71) Applicant: Brainlit AB, Lund (SE)

(72) Inventors: Jakob Singvall, Bjärred (SE); Tord Wingren, Lomma (SE); Bengt Lindoff, Bjärred (SE); Olof Hultin, Limhamn (SE); Frida Lindberg, Lund (SE)

(73) Assignee: Brainlit AB, Lund (SE)

( * ) Notice: Subject to any disclaimer, the term of this patent is extended or adjusted under 35 U.S.C. 154(b) by 48 days.

(21) Appl. No.: 18/838,786

(22) PCT Filed: Feb. 22, 2023

(86) PCT No.: PCT/EP2023/054457
§ 371 (c)(1),
(2) Date: Aug. 15, 2024

(87) PCT Pub. No.: WO2023/161292
PCT Pub. Date: Aug. 31, 2023

(65) Prior Publication Data

US 2025/0159781 A1 May 15, 2025

(30) Foreign Application Priority Data

Feb. 23, 2022 (EP) .................................... 22158203

(51) Int. Cl.
*H05B 47/155* (2020.01)
*H05B 47/16* (2020.01)

(52) U.S. Cl.
CPC ........... *H05B 47/155* (2020.01); *H05B 47/16* (2020.01)

(58) Field of Classification Search
CPC ..... A61N 5/0618; H05B 47/16; H05B 47/155
See application file for complete search history.

(56) References Cited

U.S. PATENT DOCUMENTS

2016/0219675 A1* 7/2016 Wingren .............. H05B 47/196
2019/0350066 A1 11/2019 Herf
2021/0010857 A1* 1/2021 Wingren ............... G01J 1/0271

FOREIGN PATENT DOCUMENTS

WO WO-2016145059 A1 * 9/2016 ........... H05B 47/105
WO WO-2020014688 A1 * 1/2020 ........... A61N 5/0618

OTHER PUBLICATIONS

International Search Report from International Application No. PCT/EP2023/054457 mailed May 3, 2023.

* cited by examiner

*Primary Examiner* — Patrick C Chen
(74) *Attorney, Agent, or Firm* — Shih IP Law Group, PLLC

(57) ABSTRACT

The present inventive concept relates to an illumination system and a method for controlling an illumination system configured to illuminate a zone, the illumination system being further configured to serve a plurality of individuals. The method comprising: identifying one or more individuals of the plurality of individuals present in the zone; for each individual present in the zone, obtaining a respective target light profile, each target light profile comprising time-resolved information about circadian stimuli and color temperatures of light that the respective individual is to be exposed to; assigning a priority to each individual of the plurality of individuals present in the zone based on the respective target light profile; determining a proportion of the plurality of individuals present in the zone; and upon the proportion of the plurality of individuals present in the zone is equal to or above a threshold: controlling the illumination system such that a circadian stimulus of light illuminating the zone is higher than a circadian stimulus of the target light profile associated with the individual having a highest assigned priority.

15 Claims, 3 Drawing Sheets

ILLUMINATION SYSTEM

TECHNICAL FIELD

The present inventive concept relates to an illumination system configured to serve a plurality of individuals and a method of controlling such illumination system.

BACKGROUND OF THE INVENTION

Chronobiology, which is a field of biology that studies timing (e.g., periodic) processes and phenomena in living organisms, is becoming increasingly more important for understanding human physiology. For example, the circadian rhythm is an internal process of living organisms (e.g. humans) that regulates the sleep-wake cycle. The circadian rhythm typically repeats over a time period which, for most people, is slightly longer than 24 hours. It is also known that this cycle can be different between different individuals. For example, some persons are known to be “morning” persons, while other are “evening” persons. Hence, the behavior at a certain time of day for different individual typically varies. This is usually referred to as a person’s chronotype.

An important part of chronobiology is the study of the impact of light on living organisms. It has, for example, been found that exposing a person to bright light in the evening can postpone the time that person falls asleep. Recent studies have further found that light can affect a person’s alertness and performance. Nowadays, light treatment is starting to be utilized by persons wanting to align their peak performance with an important event, for example an athlete wanting to perform the best in a competition. It has been found that the effect of light at a certain time of the day is not only instant, as it also depends on the individual’s prior exposure to light during the day. For instance, in case an individual has been exposed to bright light in the morning (e.g., light similar to that of a bright summer’s morning), the effect of bright light during the afternoon is typically less than if the same person had spent the morning being exposed to light of lower illuminance (e.g. artificial light inside an office).

However, producing bright light for exposing individuals is often associated with high energy consumption. For instance, the energy consumption of light sources typically scales linearly with brightness of emitted light. Therefore, the energy needed for exposing several individuals for their specific needs may become high.

Hence, there exists a need for improvement within the art.

SUMMARY OF THE INVENTION

It is an object to, at least partly, mitigate, alleviate, or eliminate one or more of the above-identified deficiencies in the art and disadvantages singly or in any combination and solve at least the above-mentioned problem.

According to a first aspect a method for controlling an illumination system configured to illuminate a zone, the illumination system being further configured to serve a plurality of individuals is provided. The method comprising: identifying one or more individuals of the plurality of individuals present in the zone; for each individual present in the zone, obtaining a respective target light profile, each target light profile comprising time-resolved information about circadian stimuli and color temperatures of light that the respective individual is to be exposed to; assigning a priority to each individual of the plurality of individuals present in the zone based on the respective target light profile; determining a proportion of the plurality of individuals present in the zone; and upon the proportion of the plurality of individuals present in the zone is equal to or above a threshold: controlling the illumination system such that a circadian stimulus of light illuminating the zone is higher than a circadian stimulus of the target light profile associated with the individual having a highest assigned priority.

The wording “target light profile” should within the context of this disclosure be construed as information relating to a light dose and/or an amount of light that the user should accumulate over time. The light dose and/or amount of light may be different for different wavelengths. The term “over time” may refer to a time period over which the individual should be exposed to a certain amount of light, such as a day, a week, a month etc. The target light profile may be periodical with a period of 24 hours. The target light profile may comprise information spanning more than 24 hours.

The wording “circadian stimulus” should, within the context of this disclosure, be construed as a value of an effect that light has on a circadian rhythm of an individual. Put differently, it may describe to what amount the light affects a circadian rhythm of the individual. As is known within the art, light with high brightness and/or light comprising components of the blue spectrum may have a greater effect on the circadian rhythm compared to light of low illuminance and/or of other colors. Circadian stimulus may be a measure of the effectiveness of spectrally weighted irradiance at a cornea of the individual from threshold to saturation. Put differently, circadian stimulus may be a measure of a degree of melatonin suppression of an individual after a time of light exposure. The circadian stimulus of light may be represented by a numerical value. The numerical value may be proportional to a degree of melatonin suppression of an individual after a time period of light exposure. The time period of light exposure may, e.g., be one hour. Typically, a numerical value of the circadian stimulus lower than 0.1 do not have a significant effect of the individual’s melatonin suppression, while a numerical value of the circadian stimulus higher than 0.3 do have a significant effect. A numerical value of 0.1 may therefore be regarded as a threshold. The range of numerical values of circadian stimuli may be 0 to 0.7. A numerical value of circadian stimulus of 0.7 may be associated with a largest possible melatonin suppression of the individual. A numerical value of circadian stimulus of 0.7 may therefore be regarded as saturation. As a non-limiting example, it has been found that exposure to a circadian stimulus of 0.3 or greater at an eye of the individual for, at least, one hour in the early part of the day is effective for stimulating the circadian system and is associated with one or more of better sleep, improved mood, and improved behavior.

The color temperature of the light may be a correlated color temperature. By the wording “correlated color temperature” it is hereby meant the temperature of a hypothetical blackbody radiator emitting light having the same color as the light in question. Depending on the spectral distribution of the light, a specific color temperature of the light may have various circadian stimuli.

Within the context of this disclosure, the wording “the proportion of the plurality of individuals present in the zone” should be construed as the proportion of the plurality of individuals present in the zone relative to the plurality of individuals. Put differently, in case the illumination system is configured to serve, e.g., 100 individuals, and the number of individuals present in the zone is 25, the proportion of the plurality of individuals present in the zone is 0.25 or 25%.

By means of the present inventive concept, the plurality of individuals present in the zone is exposed to light with a circadian stimulus which is higher than the highest prioritized individual in case the proportion of the plurality of individuals present in the zone is above a threshold. Put differently, all individuals present in the zone are overstimulated when the proportion of the plurality of individuals present in the zone is equal to or higher than the threshold. It has been found that the effect of light at a certain time of the day is not instant, as it depends on the individual's prior exposure to light during the day. Hence, in case the individuals present in the zone are overexposed, this then allows the same individuals to be underexposed (relative to their respective target light profile) at a later time (e.g., later during that day). For example, in case an individual is located in his/her own zone (e.g., a room) after previously being overexposed (relative to his/her target light profile), the light exposure in that zone may be adjusted such that the individual is underexposed, while still, over time, aligning the light exposure of the individual to his/her target light profile. This, in turn, means that the present inventive concepts allows energy associated with the light exposure to be saved, while still allowing each of the plurality of individuals to, over time, receive light in accordance with their respective target light profiles.

The method may further comprise: upon the proportion of the plurality of individuals present in the zone is lower than the threshold: controlling the illumination system in accordance with the target light profile associated with the individual having the highest assigned priority.

An associated advantage is that the energy consumption may be reduced, since the degree of overexposure of the plurality of individuals present in the zone is lower in case the proportion of the plurality of individuals are lower than the threshold. Put differently, since the illumination system may be controlled in accordance with the target light profile associated with the individual having the highest assigned priority, that individual may not be overexposed, while one or more individuals of the plurality of individuals may be overexposed (relative to their respective target light profile). A further associated advantage is that the illumination system may be controlled such that the lighting needs for the individual having the highest assigned priority may be fulfilled. This may, in particular, be advantageous in case the individual is the only individual in the zone.

The method may further comprise: for each individual present in the zone, obtaining a respective actual light profile, each actual light profile comprising information about circadian stimuli and color temperatures of light that the respective individual has been exposed to; and wherein the priority of each individual of the plurality of individuals present in the zone may be assigned further based on the respective actual light profile.

Within the context of this disclosure, the wording "actual light profile" should be construed as information and/or data associated with accumulated light that the user has been exposed to over time. Hence, the actual light profile may comprise information and/or data associated with one or more of wavelengths, color temperatures, and circadian stimuli of light that the associated individual has been exposed to. Put differently, the actual light profile may represent a light history of an individual over a time period.

An associated advantage is that the priority of each individual of the plurality of individuals present in the zone may be assigned in accordance with the individuals previous light exposure. This may be advantageous since the effect on the individual of light at a certain time of the day may not be instant, as it may depend on the individual's prior exposure to light during the day. For example, the priority may be assigned such that an individual having a relatively larger difference between the respective target light profile and the respective actual light profile is assigned a relatively higher priority than an individual having a relatively smaller different between the respective target light profile and the respective actual light profile.

The illumination system may be controlled further based on the actual light profile associated with the individual having the highest assigned priority.

An associated advantage is that the energy consumption of the illumination system may be further reduced, since the light history of the individual having the highest assigned priority may be accounted for when controlling the illumination system. For example, in case the individual having the highest assigned priority has received a relatively higher circadian stimuli (compared to the individual's target light profile) previously during that day, the illumination system may take that relatively higher circadian stimuli into account and therefore emit light having a relatively lower circadian stimulus, e.g., by reducing the brightness and/or intensity of the emitted light. This may be advantageous since the effect on the individual of light at a certain time of the day may not be instant, as it may depend on the individual's prior exposure to light during the day.

The priority of each individual of the plurality of individuals present in the zone may be assigned further based on an estimated future projection of the actual light profile for the respective individual.

An associated advantage is that predicted future light exposure may be considered when assigning the priority of each individual of the plurality of individuals present in the zone. This may, in turn, allow the energy efficiency of the illumination system to be improved. For example, a future activity of the individual may be that the individual resides outdoors and may therefore be expected to receive more light with higher circadian stimulus. Since that individual may be expected to receive higher circadian stimulus later during that day, the priority assigned to that individual may be relatively lower than if the individual was not planned to reside outdoors. It is further to be understood that if the priority assigned to the individual may be relatively higher in case the individual is expected to reside at a place with worse lighting environment (e.g., a room with light having lower circadian stimulus relative to the individual's target light profile).

The method may further comprise: for each of the plurality of individuals: determining future activities and/or future positions of the respective individual, and estimating the future projection of the actual light profile for the respective individual based on the determined future activities and/or future positions.

The method may further comprise: determining a time of day; and wherein the illumination system may be controlled such that the circadian stimulus of light illuminating the zone is higher than the circadian stimulus of the target light profile associated with the individual having a highest assigned priority upon the proportion of the plurality of individuals present in the zone is equal to or above a threshold and upon the determined time of day is prior to a further threshold.

An associated advantage is that exposure of the plurality of individuals present in the zone to light having a high circadian stimulus (i.e., higher than the circadian stimulus of the target light profile associated with the individual having the highest assigned priority) may be avoided during a later part of the day. For example, it may not be desired to overexpose the plurality of individuals present in the zone during the afternoon and/or evening, as that may result in an unwanted shift in their circadian rhythm (e.g., having trouble falling asleep at night). It is to be understood that the further threshold may be different for different circumstances. For example, in case the illumination system is installed in an office building in which the plurality of individuals is present between, e.g., eight in the morning and five in the afternoon (i.e., a normal day job), the further threshold may be set around noon (e.g., between 11:00 and 14:00). However, in case the illumination system is installed at a place where the circadian rhythm is offset (e.g., personnel working night shifts), the further threshold may be set at a different time (e.g., around midnight).

The illumination system may be controlled in accordance with the target light profile associated with the individual having the highest assigned priority upon the proportion of the plurality of individuals present in the zone is lower than the threshold or upon the determined time of day is at or after the further threshold.

An associated advantage is that the illumination system may be controlled such that the lighting needs for the individual having the highest assigned priority may be fulfilled. This may, in particular, be advantageous in case the individual is the only individual in the zone.

According to a second aspect, an illumination system configured to serve a plurality of individuals is provided. The illumination system comprising: a light source configured to illuminate a zone; and circuitry configured to execute: an identification function configured to identify one or more individuals of the plurality of individuals present in the zone, a target light profile function configured to, for each individual present in the zone, obtain a respective target light profile, each target light profile comprising time-resolved information about circadian stimuli and color temperatures of light that the respective individual is to be exposed to, a priority function configured to assign a priority to each individual of the plurality of individuals present in the zone based on the respective target light profile, a proportion function configured to determine a proportion of the plurality of individuals present in the zone, and a control function configured to, upon the proportion of the plurality of individuals present in the zone is equal to or above a threshold, control the light source such that a circadian stimulus of light emitted by the light source and illuminating the zone is higher than a circadian stimulus of the target light profile associated with the individual having a highest assigned priority.

The control function may be further configured to, upon the proportion of the plurality of individuals present in the zone is lower than the threshold, control the light source in accordance with the target light profile associated with the individual having the highest assigned priority.

The circuitry may be further configured to execute: an actual light profile function configured to, for each individual present in the zone, obtain a respective actual light profile, each actual light profile comprising information about circadian stimuli and color temperatures of light that the respective individual has been exposed to; and wherein the priority function may be configured to assign the priority of each individual of the plurality of individuals present in the zone further based on the respective actual light profile.

The control function may be configured to control the light source further based on the actual light profile associated with the individual having the highest assigned priority.

The circuitry may be further configured to execute: a future projection function configured to determine future activities and/or future positions of the respective individual, and to estimate a future projection of the actual light profile for the respective individual based on the determined future activities and/or future positions; and wherein the priority function may be configured to assign the priority of each individual of the plurality of individuals present in the zone further based on the estimated future projection of the actual light profile for the respective individual.

The circuitry may be further configured to execute: a time function configured to determine a time of day; and wherein the control function may be configured to control the light source such that the circadian stimulus of light emitted by the light source and illuminating the zone is higher than the circadian stimulus of the target light profile associated with the individual having a highest assigned priority upon the proportion of the plurality of individuals present in the zone is equal to or above a threshold and upon the determined time of day is prior to a further threshold; and wherein the control function may be configured to control the light source in accordance with the target light profile associated with the individual having the highest assigned priority upon the proportion of the plurality of individuals present in the zone is lower than the threshold or upon the determined time of day is at or after the further threshold.

The above-mentioned features of the first aspect, when applicable, apply to this second aspect as well. In order to avoid undue repetition, reference is made to the above.

According to a third aspect, a non-transitory computer-readable storage medium is provided. The non-transitory computer-readable storage medium comprising program code portions which, when executed by a device having processing capabilities, performs the method according to the first aspect.

The above-mentioned features of the first aspect and the second aspect, when applicable, apply to this third aspect as well. In order to avoid undue repetition, reference is made to the above.

A further scope of applicability of the present disclosure will become apparent from the detailed description given below. However, it should be understood that the detailed description and specific examples, while indicating preferred variants of the present inventive concept, are given by way of illustration only, since various changes and modifications within the scope of the inventive concept will become apparent to those skilled in the art from this detailed description.

Hence, it is to be understood that this inventive concept is not limited to the particular steps of the methods described or component parts of the systems described as such method and system may vary. It is also to be understood that the terminology used herein is for purpose of describing particular embodiments only and is not intended to be limiting. It must be noted that, as used in the specification and the appended claim, the articles "a", "an", "the", and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings do not exclude other elements or steps.

BRIEF DESCRIPTION OF THE DRAWINGS

The above and other aspects of the present inventive concept will now be described in more detail, with reference to appended drawings showing variants of the inventive concept. The figures should not be considered limiting the inventive concept to the specific variant; instead they are used for explaining and understanding the inventive concept. As illustrated in the figures, the sizes of layers and regions are exaggerated for illustrative purposes and, thus, are provided to illustrate the general structures of variants of the present inventive concept. Like reference numerals refer to like elements throughout.

DETAILED DESCRIPTION

Figure 1A:
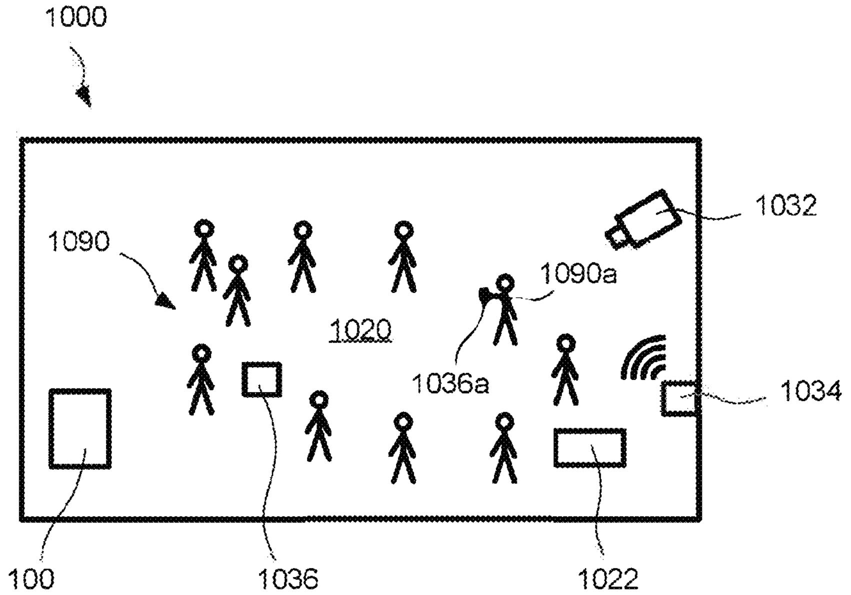
FIG. 1A illustrates an illumination system.

The present inventive concept will now be described more fully hereinafter with reference to the accompanying drawings, in which currently preferred variants of the inventive concept are shown. This inventive concept may, however, be implemented in many different forms and should not be construed as limited to the variants set forth herein; rather, these variants are provided for thoroughness and completeness, and fully convey the scope of the present inventive concept to the skilled person.

FIG. 1 illustrates an illumination system 1000 configured to serve a plurality of individuals. Put differently, the illumination system 1000 may be configured to control the lighting environment for the plurality of individuals. The illumination system 1000 may be a light control system. An example of a suitable light control system may be a BioCentric Lighting™ system provided by the applicant. The illumination system 1000 comprises a light source 1022 and circuitry 1100. The illumination 1000 system may further comprise one or more of a camera 1032, a radar 1034, and a light sensor 1036. One or more of the camera 1032 and the radar 1034 may be configured to detect and/or identify an individual. The light sensor 1036 may be configured to determine properties (e.g., one or more of intensities, wavelengths, color temperatures, and circadian stimuli) of light illuminating the zone 1020. The light source 1022 may be an adjustable light source. Put differently, light emitted by the light source 1022 may be adjustable. For instance, the intensity and/or spectral content of light emitted by the light source 1022 may be adjustable. The wording “circadian stimulus” may, within this context, be construed as a value describing an effect that light has on a circadian rhythm of an individual. Put differently, it may describe to what amount the light affects a circadian rhythm of the individual. As is known within the art, light with high brightness and/or light comprising components of the blue spectrum may have a greater effect on the circadian rhythm compared to light of low illuminance and/or of other colors. The circadian stimulus and color temperature of light emitted by the light source may be adjustable. Circadian stimulus may be a measure of a degree of melatonin suppression of an individual after a time of light exposure. The circadian stimulus of light may be represented by a numerical value. The numerical value may be proportional to a degree of melatonin suppression of an individual after a time period (e.g., an hour) of light exposure. Typically, a higher numerical value of the circadian stimulus will have a higher effect of the individual’s melatonin suppression. A range of numerical values of circadian stimuli may be 0 to 0.7. Typically, a numerical value of circadian stimulus of 0.1 may be associated with low melatonin suppression of an individual, whereas a numerical value of circadian stimulus of 0.7 may be associated with a largest possible melatonin suppression of the individual. Hence, 0.1 may be seen as a threshold for the light to have an effect on melatonin suppression, and 0.7 may be regarded as saturation. As a non-limiting example, it has been found that exposure to a circadian stimulus of 0.3 or greater at an eye of the individual for, at least, one hour in the early part of the day is effective for stimulating the circadian system. The color temperature of the light may be a correlated color temperature. Here correlated color temperature may be the temperature of a hypothetical blackbody radiator emitting light having the same color as the light in question. Depending on the spectral distribution of the emitted light, a specific color temperature of the light may be designed for various circadian stimuli. The circadian stimulus may be dependent on an intensity of light of specific wavelengths in the bluer part of the spectrum. The color temperature of light may be dependent on an overall spectrum of light. Hence, light may be designed to have a range of different circadian stimuli for a specific color temperature, and vice versa. Even though it is not explicitly illustrated in FIG. 1, it is to be understood that the zone 1020 may comprise more than one light source configured to illuminate the zone 1020. The light source 1022 is configured to illuminate the zone 1020. Even though it is not illustrated in the example of FIG. 1, the illumination system 1000 may be configured to serve a plurality of zones (e.g., rooms and/or portions of rooms). Each zone of the plurality of zones may be illuminated by one or more light sources. Even though the present inventive concept is mainly described with reference to the zone 1020 illustrated in FIG. 1, it is to be understood that the other zones may comprise one or more of the features of the referenced zone 1020.

Figure 1B:
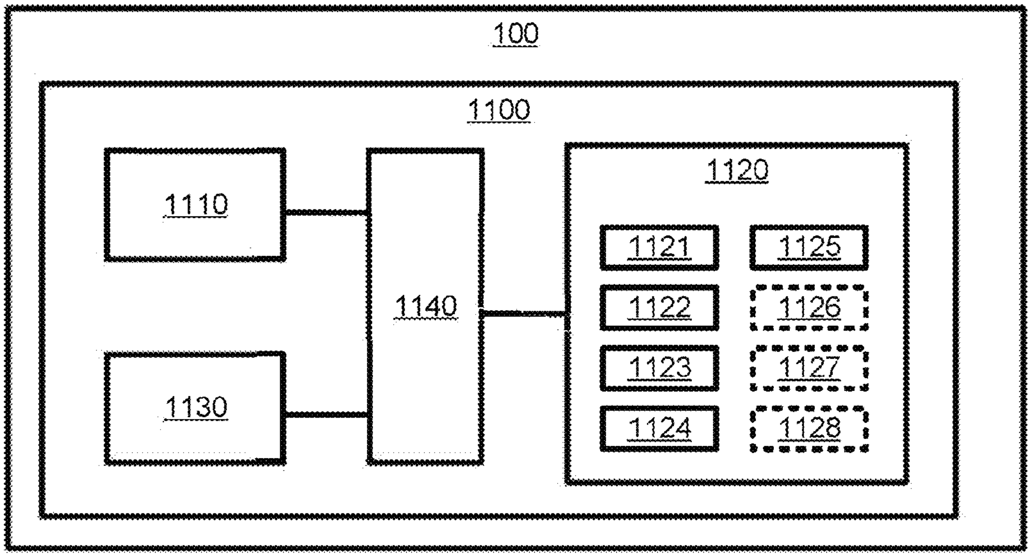
FIG. 1B illustrates a control server comprising circuitry.

As is illustrated in FIG. 1B, the circuitry 1100 may be comprised in a control server 100. The control server 100 may, as illustrated in FIG. 1A, be arranged locally. However, the control server 100 may be arranged non-locally. For instance, the control server 100 may be implemented as a physical server arranged in the vicinity of the illumination system 1000. Additionally, or alternatively, the control server 100 may be implemented as a non-local server, e.g., as a cloud server. The circuitry 1100 may comprise a single circuitry device. Alternatively, the circuitry 1100 may be distributed over several circuitry devices. As shown in the example of FIG. 1B, the circuitry 1100 may further comprise one or more of a processing unit 1110, a memory 1120, a transceiver 1130, and a data bus 1140. The processing unit 1110 may comprise one or more of a central processing unit (CPU), microcontroller, and microprocessor. The memory 1120 may be a non-transitory computer-readable storage medium. The memory 1120 may comprise one or more of a buffer, a flash memory, a hard drive, a removable media, a volatile memory, a non-volatile memory, a random-access memory (RAM), or another suitable device. In a typical arrangement, the memory 1120 may include a non-volatile memory for long term data storage and a volatile memory that functions as system memory for the illumination system 1000. The memory 1120 may exchange data with the processing unit 1110 and/or the transceiver 1130 via the data bus 1140. The transceiver 1130 may be configured to communicate with other devices. The transceiver 1130 may be configured to transmit data from the circuitry 1100 and/or the control server 100. The transceiver 1130 may be configured to receive data to the circuitry 1100 and/or the control server 100. For example, the control server 100 may retrieve data via the transceiver 1130 about the plurality of individuals from a remote server via an external network (e.g., the internet) and/or from a user device (e.g., a smartphone) associated with each individual of the plurality of individuals. Even though not explicitly illustrated in FIG. 1B, the control server 100 may comprise input devices such as one or more of a keyboard, a mouse, and a touchscreen. The circuitry 1100 may communicate with the light source 1022 via the transceiver 1130. The processing unit 1110, the memory 1120, and the transceiver 1130 may be configured to communicate via the data bus 1140. The circuitry 1100 may be configured to perform one or more functions of the control server 100. As is illustrated in FIG. 1B, the memory 1120 may store one or more program code portions 1121, 1122, 1123, 1124, 1125, 1126, 1127, 1128 corresponding to one or more functions. The processing unit 1110 may be configured to execute the program code portions 1121, 1122, 1123, 1124, 1125, 1126, 1127, 1128 stored on the memory 1120, in order to carry out functions and/or operations of the control server 100. The circuitry 1100 is configured to execute an identification function 1121, a target light profile function 1122, a priority function 1123, a proportion function 1124, and a control function 1125. The circuitry 1100 may be further configured to execute one or more of an actual light profile function 1126, a future projection function 1127, and a time function 1128. Functions and/or operations of the circuitry 100 may be implemented in the form of executable logic routines (e.g., lines of code, software programs, etc.) that are stored on the memory 1120 and may be executed by the processing unit 1110. Put differently, when it is stated that the circuitry 1100 is configured to execute a specific function, the processing unit 1110 of the circuitry 1100 may be configured to execute one or more program code portions 1121, 1122, 1123, 1124, 1125, 1126, 1127, 1128 stored on the memory 1120, wherein the one or more program code portions 1121, 1122, 1123, 1124, 1125, 1126, 1127, 1128 correspond to the specific function. Furthermore, the functions and/or operations of the circuitry 1100 may be a stand-alone software application or form a part of a software application that carries out additional tasks related to the circuitry 1100. The described functions and operations may be considered a method that the corresponding device is configured to carry out, such as the method discussed below in connection with FIG. 3. Also, while the described functions and operations may be implemented in software, such functionality may as well be carried out via dedicated hardware or firmware, or some combination of one or more of hardware, firmware, and software.

The identification function 1121 is configured to identify one or more individuals of the plurality of individuals present in the zone 1022. The identification function 1121 may be configured to identify an individual using, e.g., the camera 1032 and/or the radar 1034. The identification function 1121 may be configured to identify an individual using image processing such as face recognition etc. The identification function 1121 may be configured to identify an individual 1090*a* by being configured to identify a portable electronic device 1036*a* (e.g., a smartphone, a smartwatch, etc.) associated with the individual 1090*a*.

The target light profile function 1122 is configured to, for each individual present in the zone 1020, obtain a respective target light profile. One or more of the target light profiles may be stored on the memory 1120 of the circuitry 1100, and the target light profile function 1122 may be configured to obtain one or more of the target light profiles from the memory 1120. The target light profile function 1122 may be configured to obtain one or more of the target light profiles via the transceiver 1130. Hence, one or more of the target light profiles may be stored on a different server, e.g., a cloud server and/or a central server associated with a premise (e.g., a building and/or an office) which the illumination system 1000 is configured to serve. Each target light profile comprises time-resolved information about circadian stimuli and color temperatures of light that the respective individual is to be exposed to. Each target light profile may be associated with a respective individual. The target light profile may comprise information relating to a light dose and/or an amount of light that the respective individual should accumulate over time. The light dose and/or amount of light may be different for different wavelengths. In this context, "over time" may be a time period over which the individual should be exposed to the light specified in the target light profile, such as a day, a week, a month, etc.

The actual light profile function 1126 may be configured to, for each individual present in the zone 1020, obtain a respective actual light profile. Each actual light profile comprising information about circadian stimuli and color temperatures of light that the respective individual has been exposed to. The actual light profile may comprise information and/or data associated with accumulated light that the respective individual has been exposed to over time. Here, "over time" may be over the last 24 hours, over the present day, over the present week, over the present month, etc. The actual light profile may comprise information and/or data associated with one or more of wavelengths, intensities, color temperatures, and circadian stimuli of light that the associated individual has been exposed to. Put differently, the actual light profile may represent a light history of an individual over a time period. The actual light profile function 1126 may be configured to over time accumulate information about circadian stimuli and color temperatures of light that the respective individual is exposed to. Put differently, the actual light profile function 1126 may be configured to form the actual light profile of one or more of the plurality of individuals 1090. The actual light profile function 1126 may retrieve information about circadian stimulus and color temperature that an individual is being exposed to by communicating with the light source 1022 (or possible plurality of light sources) illuminating the zone 1020 in which the individual is present. The actual light profile function may retrieve information about circadian stimulus and color temperature that an individual is being exposed to by communicating with the light sensor 1036. The actual light profile function 1126 may be configured to accumulate color temperatures and circadian stimuli of light that each individual of the plurality of individuals present in the zone 1020 to the respective actual light profile, thereby obtaining the actual light profiles.

The future projection function 1127 may be configured to determine future activities and/or future positions of the respective individual. The future projection function 1127 may be further configured to estimate a future projection of the actual light profile for the respective individual based on the determined future activities and/or future positions. The future projection of the actual light profile may be a progress of the actual light profile over a period of time (e.g., the rest of the day, week, month, etc.). The future activities and/or future position of an individual may be determined from the individual's calendar information. For instance, the individual's calendar may comprise information regarding meeting locations, activities, etc., that may be used to estimate how the actual light profile may progress during the day. In case a future activity of the individual is determined to be an outdoors activity, the progress of the individual's actual light profile may be based on weather data associated with a position of the outdoors activity. In case a future activity is determined to be an indoors activity, the progress of the individual's actual light profile may be based on lighting information associated with a position and/or location for the indoors activity. Such lighting information (if available) may be retrieved from an illumination system configured to serve that location. In case such lighting information is not available for that location, default indoor illumination data may be used when determining a future progress (i.e., the projection) of the actual light profile. The future activities and/or future positions of the respective individual may be determined using machine learning and/or historical behavior of the respective individual. For example, the individual may usually take a stroll in the park during his/her afternoon break without having entered that information in his/her calendar. A different example is that the individual may join his/her colleagues for a coffee in a common lunchroom during breaks, again without having entered that information in the calendar. Information of this type may thereby be used when determining the future projection of the actual light profile.

The priority function 1123 is configured to assign a priority to each individual of the plurality of individuals present in the zone based on the respective target light profile. An individual having a need for light having a relatively higher circadian stimulus (according to his/her associated target light profile) may be assigned a relatively higher priority than an individual having a need for light having a relatively lower circadian stimulus (according to his/her target light profile). Put differently, a first individual which, according to a target light profile associated with the first individual, is to be exposed to light having a relatively higher circadian stimulus may be assigned a relatively higher priority than a second individual which, according to a target light profile associated with the second individual, is to be exposed to light having a relatively lower circadian stimulus. The priority function 1123 may be configured to assign the priority of each individual of the plurality of individuals present in the zone further based on the respective actual light profile. The priority of each individual of the plurality of individuals present in the zone may be assigned based on the individual's previous light exposure. For example, the priority may be assigned such that an individual having a relatively larger difference between the respective target light profile and the respective actual light profile is assigned a relatively higher priority than an individual having a relatively smaller different between the respective target light profile and the respective actual light profile. Put differently, the more similar an individual's actual light profile (i.e., accumulated light history) and target light profile are, the lower his/her assigned priority may be. Further, the more dissimilar an individual's actual light profile and target light profile are, the higher his/her assigned priority may be. The priority function 1123 may be configured to assign the priority of each individual of the plurality of individuals present in the zone further based on the estimated future projection of the actual light profile for the respective individual. Put differently, a predicted future light exposure may be considered when assigning the priority of each individual of the plurality of individuals present in the zone. This may, in turn, allow the energy efficiency of the illumination system 1000 to be improved. For example, a future activity and/or future position of the individual may indicate that the individual resides outdoors and may therefore be expected to receive more light with higher circadian stimulus. Since that individual may be expected to receive higher circadian stimulus later during that day, the priority assigned to that individual may be relatively lower than if the individual was not planned to reside outdoors. It is further to be understood that if the priority assigned to the individual may be relatively higher in case the individual is expected to, in the future, reside at a place with worse lighting environment (e.g., a room with light having lower circadian stimulus relative to the individual's target light profile).

The proportion function 1124 is configured to determine a proportion of the plurality of individuals present in the zone. The proportion of the plurality of individuals present in the zone may be the proportion of the plurality of individuals present in the zone relative to the plurality of individuals 1090. Put differently, in case the illumination system is configured to serve, e.g., 100 individuals, and the number of individuals present in the zone is 25, the proportion of the plurality of individuals present in the zone is 0.25 or 25%.

The control function 1125 is configured to, upon the proportion of the plurality of individuals present in the zone is equal to or above a threshold, control the light source 1022 such that a circadian stimulus of light emitted by the light source 1022 and illuminating the zone 1020 is higher than a circadian stimulus of the target light profile associated with the individual having a highest assigned priority. The threshold may be 50% or higher. The threshold may be 50%, 60%, 70%, 80%, 90%, or 100%, etc. Put differently, the threshold may be a majority of the plurality of individuals (i.e., a majority of the plurality of individuals is present in the zone). The plurality of individuals present in the zone 1020 is exposed to light with a circadian stimulus which is higher than the circadian stimulus of the target light profile associated with the highest prioritized individual in case the proportion of the plurality of individuals present in the zone 1020 is equal to or above the threshold. Put differently, all individuals present in the zone are overstimulated when the proportion of the plurality of individuals present in the zone 1020 is equal to or higher than the threshold. The physical effect of light on an individual at a certain time of the day is not instant, and it may depend on the individual's prior exposure to light during the day. Hence, in case the individuals present in the zone 1020 are overexposed (relative to their respective target light profiles), this then allows the same individuals to be underexposed (relative to their respective target light profile) at a later time (e.g., later during that day) and still fulfilling their respective target light profile over time (e.g., over that day). For example, in case an individual is located in his/her own zone (e.g., a room) after previously being overexposed (relative to his/her target light profile), the light exposure in that zone may be adjusted such that the individual is underexposed, while still, over time, aligning the light exposure of the individual (i.e., the individual's actual light profile) to his/her target light profile. This, in turn, means that the present inventive concepts allows an improved energy efficiency of the illumination system, since energy associated with the light exposure may be saved, while still allowing each of the plurality of individuals to, over time, receive light in accordance with their respective target light profiles.

The control function 1125 may be further configured to, upon the proportion of the plurality of individuals present in the zone 1020 is lower than the threshold, control the light source 1022 in accordance with the target light profile associated with the individual having the highest assigned priority. In such case, the degree of overexposure of the plurality of individuals present in the zone 1020 may be lower in case the proportion of the plurality of individuals present in the zone 1020 is lower than the threshold. Put differently, since the illumination system 1000 may be controlled in accordance with the target light profile associated with the individual having the highest assigned priority, that individual may not be overexposed, while one or more individuals of the plurality of individuals may be overexposed (relative to their respective target light profile).

The control function 1125 may be configured to control the light source 1022 further based on the actual light profile associated with the individual having the highest assigned priority. The illumination system 1000 may be controlled based on a difference between the actual light profile and the target light profile associated with the individual having the highest assigned priority. Since the light history of the individual having the highest assigned priority may be accounted for when controlling the illumination system 1000, the energy efficiency of the illumination system 1000 may be further improved. For example, in case the individual having the highest assigned priority has received a relatively higher circadian stimuli (compared to the individual's target light profile) previously during that day, the illumination system 1000 may take that previous relatively higher circadian stimuli into account and therefore emit light having a relatively lower circadian stimulus, e.g., by reducing the brightness and/or intensity of the emitted light.

The time function 1128 may be configured to determine a time of day. The control function 1125 may be configured to control the light source such that the circadian stimulus of light emitted by the light source 1022 and illuminating the zone 1020 is higher than the circadian stimulus of the target light profile associated with the individual having a highest assigned priority upon the proportion of the plurality of individuals present in the zone 1020 is equal to or above a threshold and upon the determined time of day is prior to a further threshold. The exposure of the plurality of individuals present in the zone 1020 to light having a high circadian stimulus (i.e., higher than the circadian stimulus of the target light profile associated with the individual having the highest assigned priority) may be avoided during a later part of the day. For example, it may not be desirable to overexpose the plurality of individuals present in the zone 1020 during the afternoon and/or evening, as that may result in an unwanted shift in their circadian rhythm (e.g., having trouble falling asleep at night). It is to be understood that the further threshold may be different for different circumstances. For example, in case the illumination system 1000 is configured to serve an office building in which the plurality of individuals is present between, e.g., eight in the morning and five in the afternoon (e.g., working a normal day job), the further threshold may be set around noon (e.g., between 11:00 and 14:00). However, in case the illumination system is configured to serve a place where the circadian rhythms of individuals present there are offset (e.g., personnel working night shifts), the further threshold may be set at a different time (e.g., around midnight).

The control function 1125 may be configured to control the light source 1022 in accordance with the target light profile associated with the individual having the highest assigned priority upon the proportion of the plurality of individuals present in the zone 1020 is lower than the threshold or upon the determined time of day is at or after the further threshold. The illumination system 1000 may be controlled such that the lighting needs for the individual having the highest assigned priority may be fulfilled.

An example scenario in which an illumination system 2000 is used will now be described with reference to FIG. 2A and FIG. 2B. For the sake of readability, features of the illumination system 2000 are not illustrated in FIG. 2A and FIG. 2B. However, it is to be understood that the illumination system 2000 of FIG. 2A and FIG. 2B may be similar to the illumination system 1000 of FIG. 1A.

Figure 2A:
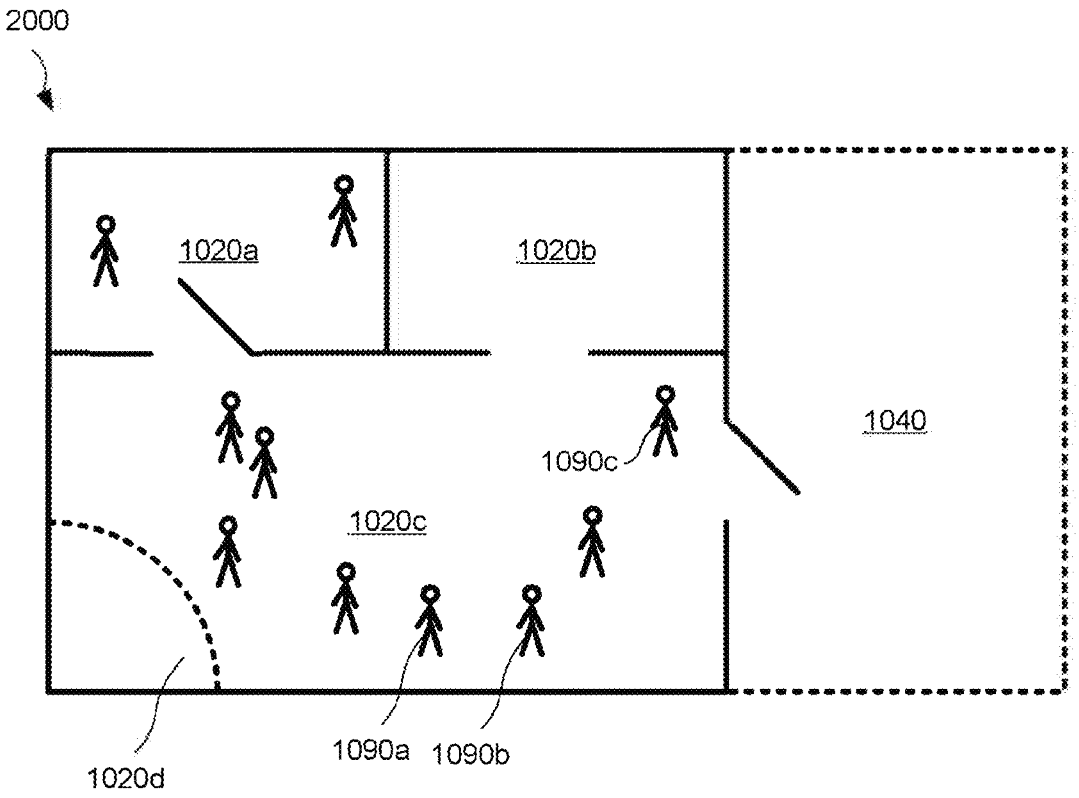
FIG. 2A illustrates an illumination system early in the day.

FIG. 2A illustrates the illumination system 2000 configured to serve a plurality of zones. In this example, a first room 1020*a*, a second room 1020*b*, a third room 1020*c*, and a portion 1020*d* of the third room 1020*c* are zones of the plurality of zones. In the example of FIG. 2A, two individuals are present in the first room 1020*a*, and eight individuals are present in the third room 1020*c*. In FIG. 2A, no individuals are present in the second room 1020*b*, in the portion 1020*d* of the third room 1020*c*, or outdoors 1040. In this example, the illustrated rooms 1020*a*, 1020*b*, 1020*c* are rooms of a workplace. In this particular workplace, ten individuals are employed and currently present. Hence, the illumination system 2000 is configured to serve ten individuals. However, it is understood that all individuals need not be present. If, for example, one individual is not present, the illumination system may be seen as configured to serve nine or ten individuals. Put differently, the proportion of individuals present in a zone may be relative to a total number of individuals (present and non-present in the zones served by the illumination system 2000) or relative to the number of individuals currently present in the zones served by the illumination system 2000. The total number of individuals may further include, e.g., visitors to the workplace.

In the example of FIG. 2A, the threshold is set to 70% and the further threshold is set to 13:00. Put differently, if the number of individuals in a room is 7 or more and that the time of day is prior to 13:00, the illumination system is configured to overexpose the individuals present in that room. However, since two of ten individuals (or 20%) are present in the first room 1020*a*, the illumination of that zone is controlled based on a target light profile, and possibly further based on an actual light profile, associated with the individual having the highest assigned priority of the two individuals present in the first room 1020*a*. Further, since no individual (or 0%) is present in the second room 1020*b*, the illumination of that zone may be switched off or set to a default illumination. The default illumination may preferably be set to save energy.

In the example of FIG. 2A, eight individuals (or 80%) are present in the third room 1020*c*. Further, in this example, the time of day is 09:00. Hence, the illumination of the third room 1020*c* is controlled such that the individuals present in that room are overexposed. The illumination system 2000 compares the priority assigned to each of the individuals present in the third room 1020*c*. In this example, the first individual 1090*a* has the highest assigned priority. Hence, the light source(s) configured to illuminate the third room 1020*c* should be controlled such that the light emitted by the light source(s) has a circadian stimulus higher than the circadian stimulus according to the target light profile associated with the first individual. The color temperature of the light emitted by the light source(s) may be the color temperature of the target light profile associated with the first individual 1090*a* or the color temperature may be altered such that it is suitable for a current activity in the third room 1020*c*. In this case, the individuals present in the third room 1020 are having a morning meeting. However, the first individual 1090*a* is scheduled to be outdoors later in the afternoon and is therefore expected to receive bright light having a high circadian stimulus. The future projection of the actual light profile of the first individual 1090*a* therefore indicates that the first individual 1090*a* will, during the afternoon, receive a circadian stimulus which is higher than specified by the first individual's 1090*a* target light profile. Hence, the assigned priority of the first individual 1090*a* is lowered in this example.

A second individual 1090*b* also present in the third room 1020*c* has not received light in accordance with his/her target light profile earlier during the day. Hence, a difference between the actual light profile and the target light profile associated with the second individual 1090*b* is large, which, in this example, results in a higher assigned priority for the second individual 1090*b*. In this example, since the first individual's 1090*a* priority is lowered (due to the projected actual light profile), the assigned priority to the second individual 1090*b* is the highest. Hence, the illumination system 2000 is controlled such that the light emitted by the light source(s) has a circadian stimulus higher than the circadian stimulus according to the target light profile associated with the second individual 1090*b*.

Figure 2B:
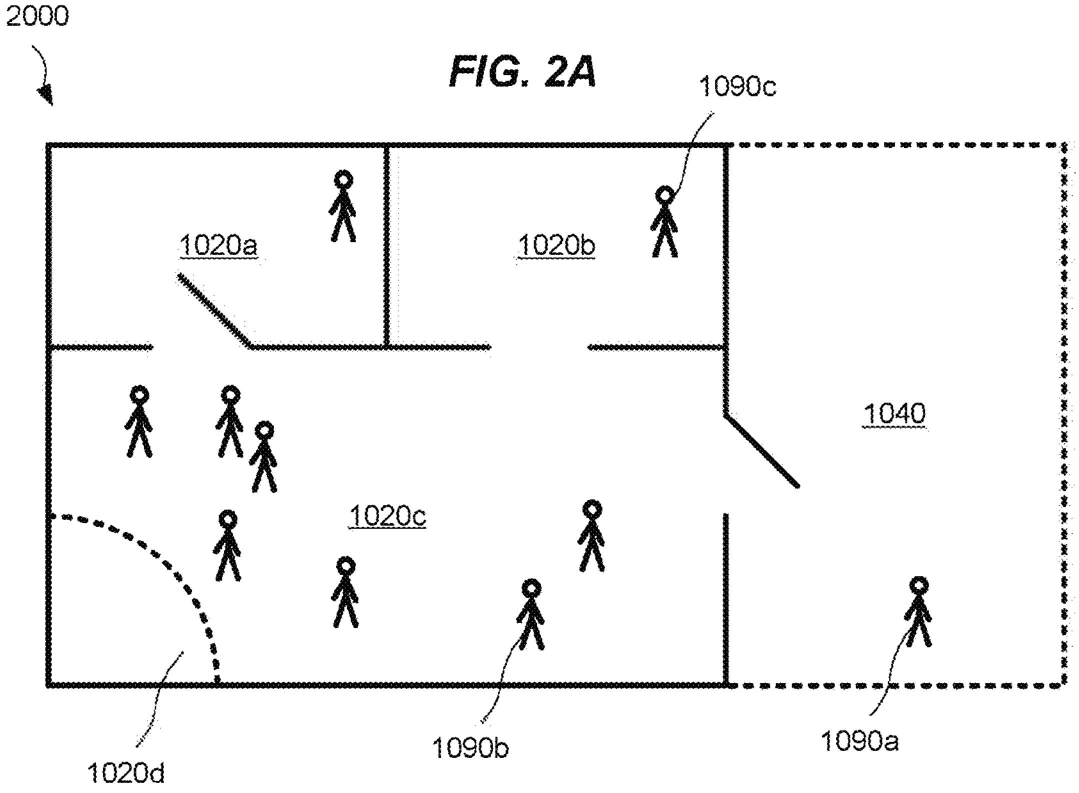
FIG. 2B illustrates the illumination system of FIG. 2A later in the day.

In the afternoon, which is illustrated in the example of FIG. 2B, the first individual 1090*a* is outdoors 1040. The actual light profile of the first individual 1090*a* is updated using weather data associated with an outdoor position of the first individual 1090*a*. The proportion of individuals present in the first room 1020*a* is 70% (seven of ten individuals) which is equal to the threshold. Alternatively, the proportion of individuals present in the first room 1020*a* may be seen as being approximately 78% (seven of nine individuals, since the first individual 1090*a* is not present at the workplace). However, since the time of day of the example of FIG. 2B is 15:00 (i.e., later than the further threshold), the illumination system 2000 is controlled based on the target light profile (and possibly the actual light profile) of the individual having the highest assigned priority. In the example of FIG. 2B, a third individual 1090*c* is present in the second room 1020*b*. Earlier in the day (i.e., in the example of FIG. 2A), the third individual 1090*c* was present in the third room 1020*c*. The third individual 1090*c* was therefore exposed to light having a circadian stimulus higher than a circadian stimulus of the target light profile associated with the second individual 1090*b*. Hence, earlier during the day, the third individual 1090*c* was overexposed relative to his/her target light profile. In this case, the illumination of the second room 1020*b* may therefore be controlled such that the circadian stimulus is lower than a circadian stimulus of the target light profile associated with the third individual 1090*c*, while still allowing the actual light profile and the target light profile associated with the third individual to be aligned, e.g., at the end of the day.

Thus, since more than one individual was overexposed (relative to their respective target light profiles) during the morning meeting in the third room 1020*c*, those individuals may be underexposed (relative to their respective target light profiles) later in the day. In this way, the illumination system 2000 may be more energy efficient while still allowing the plurality of individuals to be exposed to light in accordance with their respective target light profiles over the day. Put differently, the actual light profiles of the individuals may be aligned with their respective target light profiles over time (e.g., at the end of the day).

Figure 3:
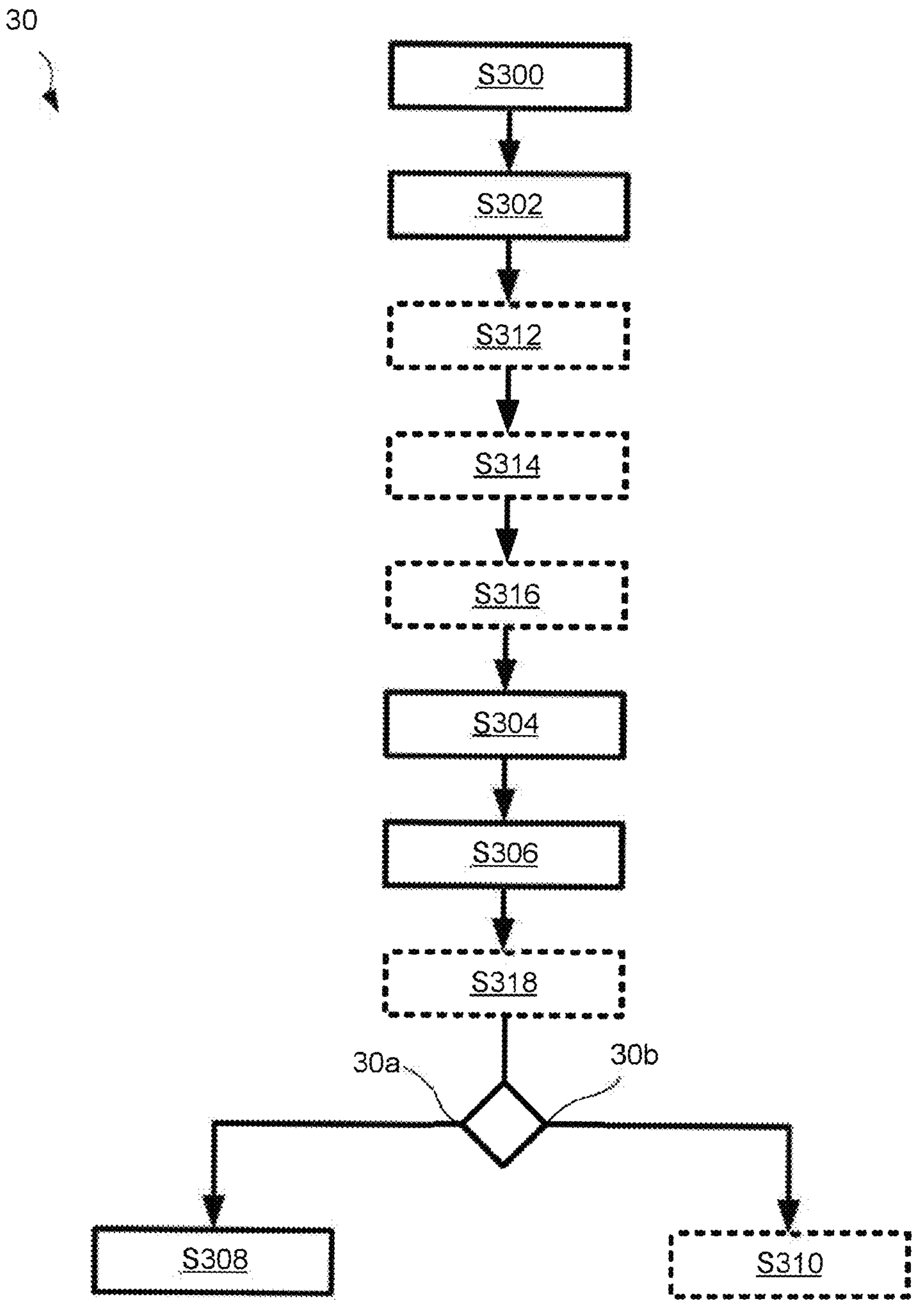
FIG. 3 is a block scheme of a method for controlling an illumination system configured to illuminate a zone.

FIG. 3 is a block scheme of a method 30 for controlling an illumination system configured to illuminate a zone, the illumination system being further configured to serve a plurality of individuals.

The method 30 comprising identifying S300 one or more individuals of the plurality of individuals present in the zone; for each individual present in the zone, obtaining S302 a respective target light profile, each target light profile comprising time-resolved information about circadian stimuli and color temperatures of light that the respective individual is to be exposed to; assigning S304 a priority to each individual of the plurality of individuals present in the zone based on the respective target light profile; determining S306 a proportion of the plurality of individuals present in the zone; and upon the proportion of the plurality of individuals present in the zone is equal to or above a threshold: controlling S308 the illumination system such that a circadian stimulus of light illuminating the zone is higher than a circadian stimulus of the target light profile associated with the individual having a highest assigned priority.

The method 30 may further comprise: upon the proportion of the plurality of individuals present in the zone is lower than the threshold: controlling S310 the illumination system in accordance with the target light profile associated with the individual having the highest assigned priority.

The method 30 may further comprise: for each individual present in the zone, obtaining S312 a respective actual light profile, each actual light profile comprising information about circadian stimuli and color temperatures of light that the respective individual has been exposed to; and wherein the priority of each individual of the plurality of individuals present in the zone may be assigned S304 further based on the respective actual light profile.

The illumination system may be controlled S308, S310 further based on the actual light profile associated with the individual having the highest assigned priority.

The priority of each individual of the plurality of individuals present in the zone may be assigned S304 further based on an estimated future projection of the actual light profile for the respective individual.

The method 30 may further comprise: for each of the plurality of individuals: determining S314 future activities and/or future positions of the respective individual, and estimating S316 the future projection of the actual light profile for the respective individual based on the determined future activities and/or future positions.

The method 30 may further comprise: determining S318 a time of day; and wherein the illumination system may be controlled S308 such that the circadian stimulus of light illuminating the zone is higher than the circadian stimulus of the target light profile associated with the individual having a highest assigned priority upon the proportion of the plurality of individuals present in the zone is equal to or above a threshold and upon the time of day is prior to a further threshold.

The illumination system may be controlled S310 in accordance with the target light profile associated with the individual having the highest assigned priority upon the proportion of the plurality of individuals present in the zone is lower than the threshold or upon the time of day is at or after the further threshold.

Figure 4:
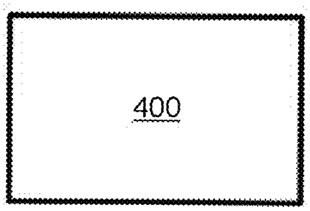
FIG. 4 illustrates a non-transitory computer-readable storage medium.

FIG. 4 illustrates a non-transitory computer-readable storage medium. The non-transitory computer-readable storage medium comprises program code portions which, when executed by a device having processing capabilities, performs the method illustrated in FIG. 3.

The person skilled in the art realizes that the present inventive concept by no means is limited to the preferred variants described above. On the contrary, many modifications and variations are possible within the scope of the appended claims. Additionally, variations to the disclosed variants can be understood and effected by the skilled person in practicing the claimed invention, from a study of the drawings, the disclosure, and the appended claims.

The invention claimed is:

1. A method for controlling an illumination system configured to illuminate a zone, the illumination system being further configured to serve a plurality of individuals, the method comprising:

identifying one or more individuals of the plurality of individuals present in the zone;

for each individual present in the zone, obtaining a respective target light profile, each target light profile comprising time-resolved information about circadian stimuli and color temperatures of light that the respective individual is to be exposed to;

assigning a priority to each individual of the plurality of individuals present in the zone based on the respective target light profile;

determining a proportion of the plurality of individuals present in the zone; and upon the proportion of the plurality of individuals present in the zone is equal to or above a threshold:

controlling the illumination system such that a circadian stimulus of light illuminating the zone is higher than a circadian stimulus of the target light profile associated with the individual having a highest assigned priority.

2. The method according to claim 1, further comprising:

upon the proportion of the plurality of individuals present in the zone is lower than the threshold:

controlling the illumination system in accordance with the target light profile associated with the individual having the highest assigned priority.

3. The method according to claim 1, further comprising:

for each individual present in the zone, obtaining a respective actual light profile, each actual light profile comprising information about circadian stimuli and color temperatures of light that the respective individual has been exposed to; and wherein the priority of each individual of the plurality of individuals present in the zone is assigned further based on the respective actual light profile.

4. The method according to claim 3, wherein the illumination system is controlled further based on the actual light profile associated with the individual having the highest assigned priority.

5. The method according to claim 1, wherein the priority of each individual of the plurality of individuals present in the zone is assigned further based on an estimated future projection of the actual light profile for the respective individual.

6. The method according to claim 5, further comprising:

for each of the plurality of individuals:

determining future activities and/or future positions of the respective individual, and estimating the future projection of the actual light profile for the respective individual based on the determined future activities and/or future positions.

7. The method according to claim 1, further comprising:

determining a time of day; and wherein the illumination system is controlled such that the circadian stimulus of light illuminating the zone is higher than the circadian stimulus of the target light profile associated with the individual having a highest assigned priority upon the proportion of the plurality of individuals present in the zone is equal to or above a threshold and upon the determined time of day is prior to a further threshold.

8. The method according to claim 7, wherein the illumination system is controlled in accordance with the target light profile associated with the individual having the highest assigned priority upon the proportion of the plurality of individuals present in the zone is lower than the threshold or upon the determined time of day is at or after the further threshold.

9. A non-transitory computer-readable storage medium comprising program code portions which, when executed by a device having processing capabilities, performs the method according to claim 1.

10. An illumination system configured to serve a plurality of individuals, the illumination system comprising:

a light source configured to illuminate a zone; and circuitry configured to execute:

an identification function configured to identify one or more individuals of the plurality of individuals present in the zone, a target light profile function configured to, for each individual present in the zone, obtain a respective target light profile, each target light profile comprising time-resolved information about circadian stimuli and color temperatures of light that the respective individual is to be exposed to, a priority function configured to assign a priority to each individual of the plurality of individuals present in the zone based on the respective target light profile, a proportion function configured to determine a proportion of the plurality of individuals present in the zone, and a control function configured to, upon the proportion of the plurality of individuals present in the zone is equal to or above a threshold, control the light source such that a circadian stimulus of light emitted by the light source and illuminating the zone is higher than a circadian stimulus of the target light profile associated with the individual having a highest assigned priority.

11. The illumination system according to claim 10, wherein the control function is further configured to, upon the proportion of the plurality of individuals present in the zone is lower than the threshold, control the light source in accordance with the target light profile associated with the individual having the highest assigned priority.

12. The illumination system according to claim 10, wherein the circuitry is further configured to execute:

an actual light profile function configured to, for each individual present in the zone, obtain a respective actual light profile, each actual light profile comprising information about circadian stimuli and color temperatures of light that the respective individual has been exposed to; and wherein the priority function is configured to assign the priority of each individual of the plurality of individuals present in the zone further based on the respective actual light profile.

13. The illumination system according to claim 12, wherein the control function is configured to control the light source further based on the actual light profile associated with the individual having the highest assigned priority.

14. The illumination system according to claim 10, wherein the circuitry is further configured to execute:

a future projection function configured to determine future activities and/or future positions of the respective individual, and to estimate a future projection of the actual light profile for the respective individual based on the determined future activities and/or future positions; and wherein the priority function is configured to assign the priority of each individual of the plurality of individuals present in the zone further based on the estimated future projection of the actual light profile for the respective individual.

15. The illumination system according to claim 10, wherein the circuitry is further configured to execute:

a time function configured to determine a time of day; and wherein the control function is configured to control the light source such that the circadian stimulus of light emitted by the light source and illuminating the zone is higher than the circadian stimulus of the target light profile associated with the individual having a highest assigned priority upon the proportion of the plurality of individuals present in the zone is equal to or above a threshold and upon the determined time of day is prior to a further threshold; and wherein the control function is configured to control the light source in accordance with the target light profile associated with the individual having the highest assigned priority upon the proportion of the plurality of individuals present in the zone is lower than the threshold or upon the determined time of day is at or after the further threshold.

* * * * *